United States Patent [19] [11] 3,733,991
Kobayashi et al. [45] May 22, 1973

[54] LENS SHUTTER
[75] Inventors: Tatsuo Kobayashi; Masayuki Mino, both of Osaka, Japan
[73] Assignee: Minolta Camera Kabushiki Kaisha, Osaka-fu, Japan
[22] Filed: May 28, 1970
[21] Appl. No.: 41,195

[30] Foreign Application Priority Data
June 3, 1969  Japan .................................. 44/43007

[52] U.S. Cl. .................... 95/63, 95/64 R, 95/64 B, 95/64 C, 95/64 D
[51] Int. Cl. ............................................. G03b 9/14
[58] Field of Search ...................... 95/63, 64 R, 64 A, 95/64 B, 64 C, 64 D

[56] References Cited

UNITED STATES PATENTS

| 2,978,970 | 4/1961 | Fahlenberg | 95/63 X |
| 3,326,108 | 6/1967 | Kitai | 95/64 A |
| 3,492,928 | 2/1970 | Kitai | 95/64 A X |
| 3,545,362 | 12/1970 | Kitai | 95/64 |
| 3,320,866 | 5/1967 | Bertram | 95/63 |
| 3,309,978 | 3/1967 | Kiper | 95/63 |
| 3,468,237 | 9/1969 | Cotta | 95/63 |
| 3,421,427 | 1/1969 | Starp | 95/63 |

Primary Examiner—Samuel S. Matthews
Assistant Examiner—Monroe H. Hayes
Attorney—Watson, Cole, Grindle & Watson

[57] ABSTRACT

In a camera lens shutter apparatus having an exposure time setting member, an exposure setting member, and shutter blades, and structure for opening and closing the shutter blades, a first control mechanism controls the speed of the shutter blades at a maximum aperture setting and a second control mechanism additionally controls the speed of the shutter blades so that the opening and closing time interval thereof corresponds to a settable exposure time setting. A retarding mechanism is interlocked with the blade driving means for varying the opening and closing speed of the shutter blades in accordance with the setting of an exposure time setting member.

6 Claims, 16 Drawing Figures

LENS SHUTTER

BACKGROUND OF THE INVENTION

In the prior lens shutters, an attempt has been made to increase the opening and closing speed of the blades as far as possible so as to bear a close resemblance to the ideal speed, as shown in FIG. 1. In this manner, the opening time of the shutter corresponds to the exposure time and the efficiency is closer to 100 percent.

In such an ideal shutter, the aberration of a photographic image is decided singularly by the performance based on the aberration characteristics of the lens itself. Therefore, in such a shutter, it is impossible to decrease the aberration effect and improve the defocused image by improving operation of the shutter.

On the contrary, in lens shutters the programmed exposure time and aperture value are set in order to facilitate automatic exposure control. In shutters of this kind the aperture value is determined by the opening of a set of shutter blades controlling exposure times, the opening speed or closing speed of the blades being set at a predetermined speed slower than the opening speed or closing speed of an ideal shutter, without reference to the open period and the aperture value.

The aperture is determined, relative to the exposure time, by the above speed. Accordingly, to decrease the effect of aberrations and improve the defocused image through the shutter, the opening or closing speed cannot be controlled in accordance with the open period and the aperture value.

SUMMARY OF THE INVENTION

In the present invention, by setting up the exposure time and the aperture of the shutter blades independently, the set value controls respectively both or either the opening speed and the closing speed of the shutter blades and modifies the effect to the picture image due to the lens aberration, and sets the opening speed and the closing speed so as to obtain a suitable image.

The primary object of the present invention is to provide a lens shutter in which both or either the opening speed and the closing speed of the shutter blades are controlled in setting up the exposure time.

The second object of the present invention is to provide a lens shutter so formed that the shutter blades in which both or either the opening speed and the closing speed are changed in accordance with the setting of the exposure time serve also as the diaphragm blades so as to change the opening speed and the closing speed of the blades in accordance with the setting of the aperture.

The third object of the present invention is to provide, in a lens shutter of the aforementioned type in which both or either the opening speed and the closing speed of the blade members are controlled in accordance with the setting of the exposure time, a shutter in which the aperture set up can be continued for a microscopic time.

The fourth object of the present invention is to provide a shutter for controlling the opening speed and the closing speed of the blade members which are determined by the exposure time and the aperture diameter, at an approximately equal speed.

The fifth object of the present invention is to provide a shutter capable of controlling differently the opening speed and the closing speed of the blade members respectively controlled in accordance with the setting of the exposure time.

The sixth object of the present invention is to provide a shutter capable of controlling the retarding force of a retard mechanism for acting upon the blade members by setting up the exposure time and the aperture diameter, so as to control both or either the opening speed and the closing speed of the blade members.

The seventh object of the present invention is to provide a shutter capable of controlling variably both or either of the opening speed and the closing speed of the blade members and simultaneously both or either the opening acceleration and the closing acceleration thereof, in accordance with the setting of the exposure time and the aperture diameter.

DESCRIPTION OF THE PREFERRED EMBODIMENT

Figure 1:
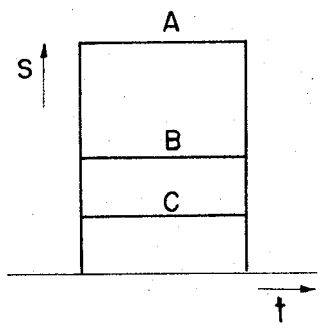
FIG. 1 is a diagram showing the exposure curves in an ideal lens shutter.

With reference to the accompanying drawings, FIG. 1 shows the exposure curve for the specific exposure time of an ideal shutter, and the aperture diameter is decided by ordinate S and in accordance with the setting such as A, B, and C. And, abscissa $t$ denotes the lapse of time and the length of time in accordance with the setting of the exposure time. And, the area of a rectangle thereof denotes the exposure.

Figure 2:
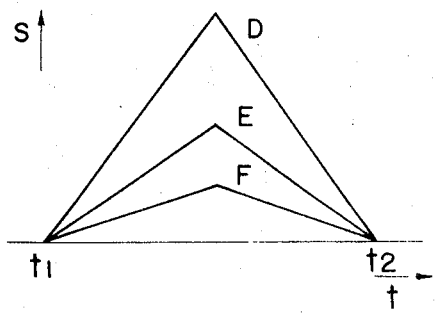
FIG. 2 shows an example of respective exposure curves in case where the exposure time is set for a constant value and the aperture diameter is changed as in the present invention.
Figure 3:
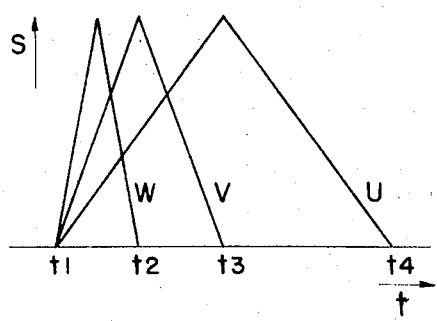
FIG. 3 shows an example of respective exposure curves in the case where the aperture diameter is set for a constant value and the exposure time is changed as in the present invention.

FIG. 2 and FIG. 3 show respectively an example of the exposure curves in accordance with the present invention, wherein FIG. 2 shows the case where the exposure time is kept constant and the aperture diameter is set for various values, and the opening of the blade members is varied in accordance with the aperture value as shown by D, E, and F. Therefore, by changing the aperture diameter the opening speed of the blade members undergoes a change because the slope of $t_1D$, $t_1E$, and $t_1F$ undergoes a change. In the same manner, the closing speed of the blade members also undergoes a change. FIG. 3 denotes the exposure curve in the case where the aperture diameter is maintained constant and the exposure time is changed, and the exposure curve is changed as shown by W, V and U in accordance with the exposure time $t_1t_2$, $t_1t_3$, and $t_1t_4$. Also in this case the opening speed and the closing speed of the blade members undergo a change. This fact shows that various exposure values can be obtained by changing the opening and closing speed of the blade members, and that proper exposure can be obtained by controlling the opening and/or closing speed of the blade members in accordance with the aperture and shutter speed setting.

Figure 7:
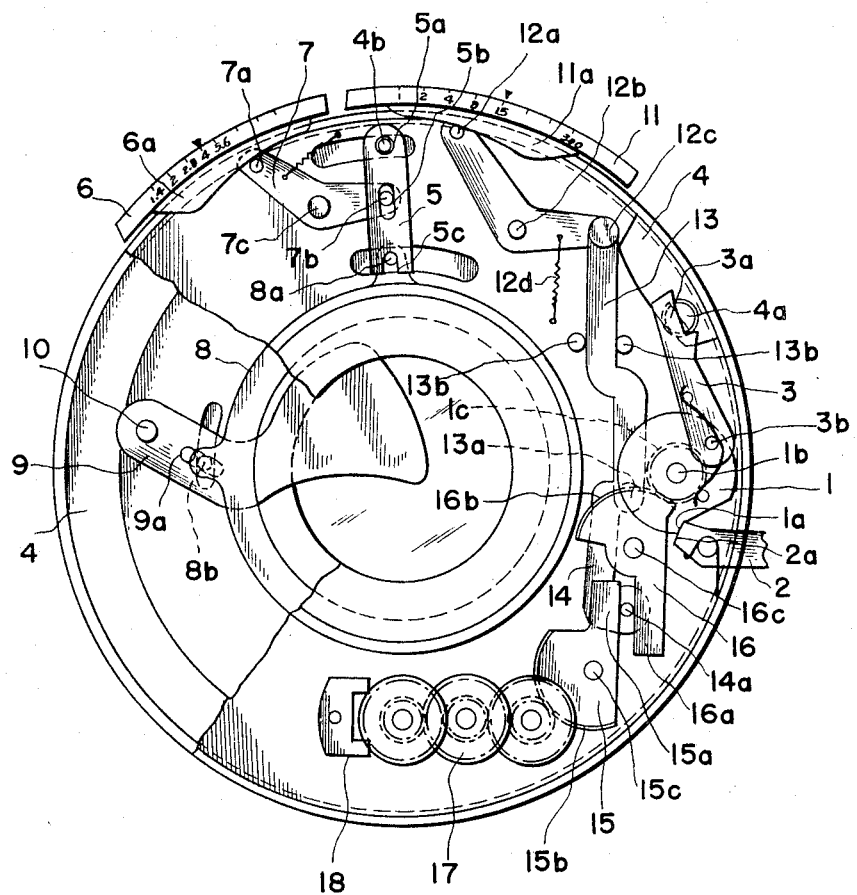
FIG. 7 is a front view of the first embodiment in accordance with the present invention and shows the shutter in a cocked condition.

With reference to the first embodiment shown in FIG. 7 in accordance with the present invention, main driving disk 1 is formed as is well known in the art, and just as disk 1 is rotated clockwise by means of the shutter charge operation and the charging is finished, locking surface 1a thereof engages with pawl 2a of one end of release lever 2 to be locked. Release lever 2 is rotated counterclockwise by the release operation and main driving disk 1, when the engagement of locking surface 1a with pawl 2a is released, is rotated by a spring (not shown) from a charged position as shown in FIG. 7. On the tip portion of connection rod 3 connected by pin 3b onto the upper surface of disk 1 shaped notch portion 3a is provided, and crescent pin 4a on intermediate ring 4 engages with the inside of notch portion 3a. And, another pin 4b on intermediate ring 4 is mounted in hole 5a provided on one end of intermediate lever 5 and coupled therewith. Intermediate lever 5 is provided in the middle thereof with long slot 5b and on the other end thereof with fork portion 5c. In long slot 5b there is loosely fitted pin 7b provided on one end of lever 7 having a clockwise turning tendency through spring 7d, and another pin 7a is provided on the other end of lever 7 and engages with cam portion 6a of aperture value setting ring 6.

Sector ring 8, provided with pin 8a for engaging with fork portion 5c, is provided with several fixed pins 8b, and blade members 9 provided with long slot 9a in which fixed pins 8b are mounted are respectively connected rotatably to fixed pin 10 so as to be opened or closed through reciprocating turns of sector ring 8.

Pin 12a, provided on one end of lever 12 pivotally mounted on pin 12b and having a clockwise turning tendency through spring 12d, comes into contact and engages with cam 11a of exposure time setting ring 11, and the other end of lever 12 is linked with slide lever 13 by means of pin 12c. Slide lever 13 is guided by guide pins 13b and at the same time supported by them, and to the other end of slide lever 13 shutter speed change lever 14 is connected rotatably by pin 13a. And, on the tip portion of shutter speed change lever 14 shutter speed change pin 14 a is fixed.

Two sector wheels 15, 16 are respectively connected to the shutter ground plate by pins 15c, 16c and provided respectively with arms 15a, 16a. Tooth portion 16b of one sector wheel 16 meshes with toothed wheels 1c fixed coaxially to pin 16 of main driving disk 1, and tooth portion 15b of the other sector wheel 15 engages with anchor 18 through gear train 17 and has a clockwise turning tendency through a weak spring (not shown in the drawings). Arms 15a, 16a are formed so as to interpose shutter speed change pin 14a between opposed faces thereof.

In the first embodiment formed as described above, just as release lever 2 is rotated counter-clockwise, pawl 2a thereof disengages from step portion 1a of disk 1 and disk 1 is rotated counter-clockwise through a strong-spring (not shown in the drawings). Also intermediate ring 4, interlocked with disk 1 by connection rod 3, is rotated counter-clockwise, so that intermediate lever 5 is rotated counter-clockwise using pin 7b as a center and sector ring 8 of which pin 8a engages with fork portion 5c, is rotated clockwise, and fixed pin 8b thereof engages with long slot 9a provided on sector 9 to rotate sector 9 counter-clockwise using pin 10 as a center so as to give sector 9 the opening motion resulting in the position shown in FIG. 8. Furthermore, just as disk 1 is rotated, in the opposite direction, sector 9 begins its closing motion to close the shutter.

In the meantime wheel 1c mounted coaxially with disk 1 rotates sector wheel 16 clockwise and arm 16a thereof pushes arm 15a of the other sector wheel 15 by way of speed change pin 14a to rotate sector wheel 15 counter-clockwise. The aforesaid rotation is retarded by mechanical resistance 18 through gear train 17. Therefore, the rotation of disk 1 is retarded and the opening speed and the closing speed of sector 9 also are delayed.

Now, in the position shown in FIG. 7 just as diaphragm setting ring 6 is moved clockwise and the aperture diameter is set, cam 6a thereof pushes pin 7a so that lever 7 rotates counter-clockwise against spring 7d using pin 7c as a pivot and fixed pin 7b moves in long slot 5b from the optical axis to the outside. Therefore, the pivot of intermediate lever 5 moves, and the interval between arms 7a and 4b is shortened and the interval between arms 7b and 8a is lengthened. As a result, the rotating speed of the sector ring 8 increases relative to the rotating speed of intermediate ring 4. This fact means that the opening speed and the closing speed of the blade members is increased, and the slope of the exposure curve gets steep and is changed from E to D in FIG. 2. To the contrary, just as diaphragm setting ring 6 is rotated so as to reduce the aperture diameter, the opening speed and the closing speed of the blade members is slowed and the slope of the exposure curve thereof decreases and is changed from E to F in FIG. 2.

Next, just as the diaphragm setting ring 6 is stopped at a certain position and the exposure time setting ring 11 is rotated counter-clockwise and set for a short time, lever 12 is rotated counter-clockwise by cam 11a and slide lever 13 connected by pin 12c to said lever 12 is moved upwardly in FIG. 7. Accordingly, shutter speed change pin 14a interposed between arms 16a, 15a of sector wheels 16, 15 also is moved upwardly, and the arm length between pin 16c and pin 14a is shortened and the arm length between pin 15c and pin 14a is lengthened, so that the turning force of disk 1 to be applied to mechanical resistances 17, 18 becomes larger and the turning speed thereof increases. Thus, the opening speed and the closing speed of blade 9 becomes faster therefore, the exposure curve shown in FIG. 3 switches to W from V. Further, just as exposure time setting ring 11 is moved clockwise to set up a long exposure time, the opening speed and the closing speed of blade 9 are slowed and the exposure curve shown in FIG. 3 switches to U from V.

From the above description it is understood that in the first embodiment it is possible to reduce remarkably the opening speed and the closing speed of the blade members as compared with an ideal shutter and change these speeds in accordance with the setting of the aperture diameter and the exposure speed.

Figure 9:
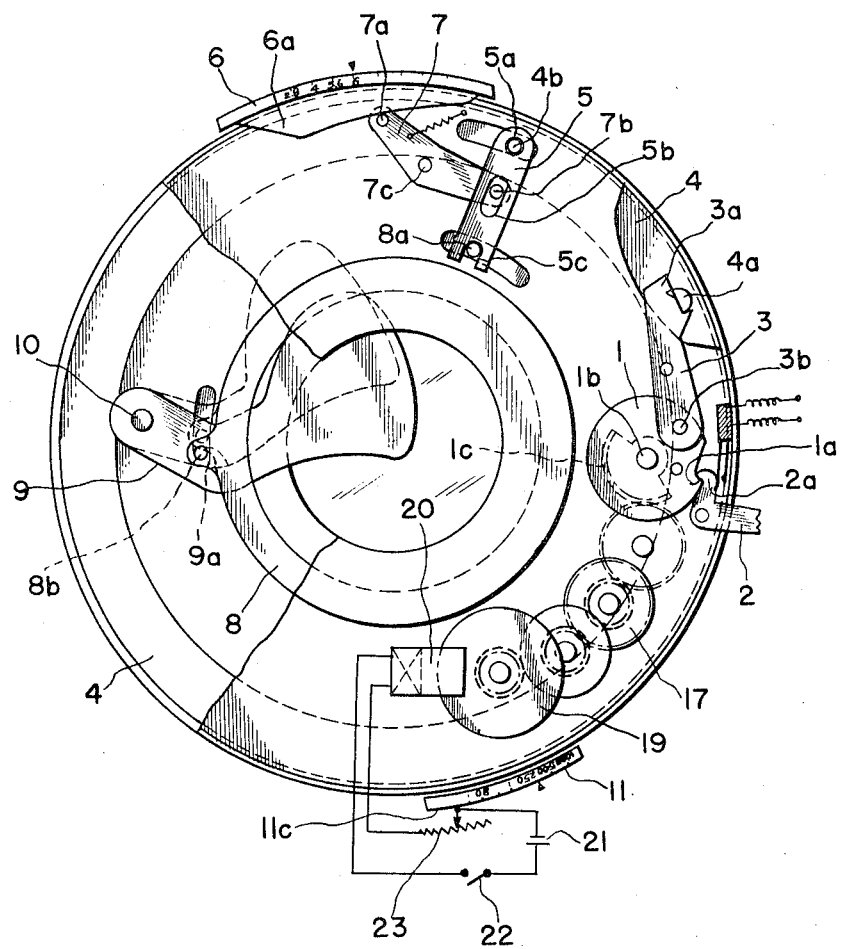
FIG. 9 is a front view of the second embodiment in accordance with the present invention.

In the second embodiment shown in FIG. 9, instead of the mechanical resistance an electrical damper is used. That is, on exposure time setting ring 11 slide brush 11c is provided so as to slide on slide resistance 23. On the final gear of gear train 17 metal disk 19 is provided, and on both sides of a partial perimeter of metal disk 19 electrode 20 is provided. And, in the circuit including electrode 20 power source 21 and slide resistance 23 are connected so as to provide an electrical damper operating on eddy-current. And thus, just as exposure time setting ring 11 is moved, the resistance value of slide resistance 23 is changed and the current running through a coil (not shown in the drawings) of electrode 20 is changed, so that the opening speed and the closing speed of the blade members are changed as well.

Figure 4:
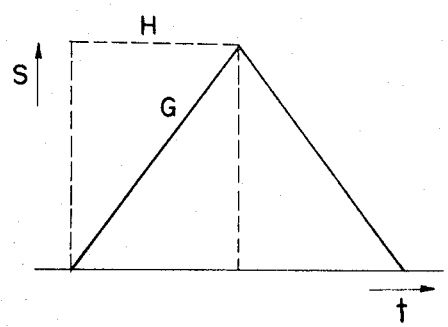
FIG. 4 is a graph representing the operating cycle of the shutter of the present invention as compared with that of an ideal shutter.

When the performance and action of the shutter of both embodiments described above in accordance with the present invention is compared with the performance and action of the ideal shutter, it is possible to denote the exposure curve for the same effective exposure time and aperture diameter of both shutters are shown by curve G shown by a solid line in FIG. 4 and curve H shown by a broken line.

Figure 10:
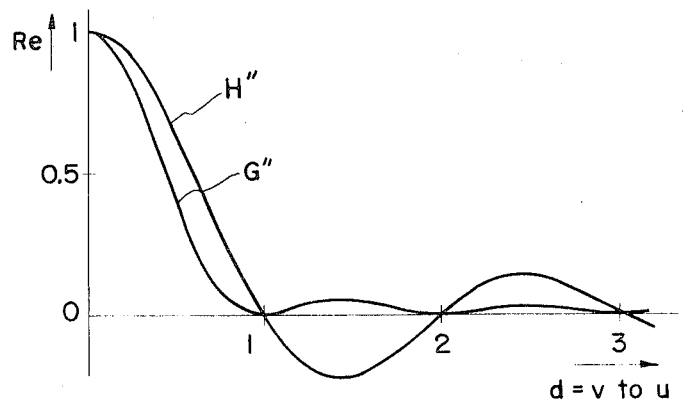
FIG. 10 is a diagram showing the response functions of the blurred image photographed by means of the shutter in accordance with the present invention and an ideal shutter.

First, the deterioration of picture quality for both shutters caused by a moving image will be examined. Supposing the image moves on a straight line at a constant speed and the image is photographed by a shutter having the exposure curves G; H and the quality of the picture image in this case is shown by the response function. Thus it is possible to obtain the G" and H" curves shown in FIG. 10. In FIG. 10, abscissa $d$ denotes the product of image speed $v$, effective exposure time $te$, and space frequency $u$, and the ordinate denotes the response value. A point where the response is zero first denotes the resolving power and at this point both curves G" and H" show the same value. And, for an estimation of the capability of representing a synthetic image including a portion outside of the resolving power, the sum total of positive and negative areas between the curves and the abscissa becomes the same. Therefore, in both shutters the deterioration of picture quality caused by the movement of the image is the same. From this fact, it is understood that the capability for stopping a moving image of the picture does not vary with both shutters.

Figure 5:
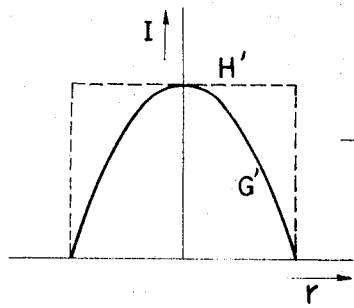
FIG. 5 shows the local variation of the transmission light quantity with respect to the aperture of a shutter in accordance with the present invention and an ideal shutter.

Next, the effect due to the lens aberration on the characteristics of a defocused picture image will be examined. The local variation of the transmission of the quantity of light in the case where the lens is opened by a shutter having the exposure characteristic curves of G and H shown in FIG. 4, assumes the characteristics of the curves of G' and H' shown in FIG. 5 as the result of computation. In FIG. 5, ordinate I represents the quantity of light transmitted and abscissa $r$ is the radius of the lens.

It is well known that in general a lens produces greater aberration at its perimeter than at the center of the lens, however, the quantity of light transmitted to the perimeter of the shutter shown in FIG. 5 in accordance with the present invention is less than that of the ideal shutter, so that it is possible to reduce the effects of lens aberration. As a matter of course, also in the ideal shutter, by reducing the aperture diameter it is possible to reduce the effects of lens aberration, however, in order to obtain the same exposure a very long exposure time is required and the capability of stopping a moving image is decreased and in addition the possibility of camera movement may occur during the exposure. Whereas, the shutter in accordance with the present invention does not decrease the capability of stopping a moving image at all and can reduce the effects due to lens aberration.

Figure 6:
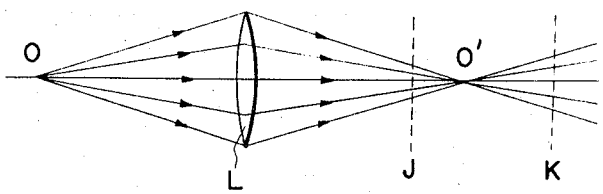
FIG. 6 is a side view showing the state under which a beam of light from a point light source forms an image on a conjugate point through an objective lens.

Further, there must be considered the characteristics of a defocused image. An object in general is taken to be an aggregate of points having various degrees of brightness, so that a certain particular point has a degree of brightness. FIG. 6 shows the conditions at which a beam of light from a particular point 0 forms an image through an objective lens. Even in what is called "Rear focus" where the image forming plane is at J for the point image at 0' which is a conjugate focus of 0, or in what is called "Front focus" where the image forming plane is at K, the distribution of light intensity at the image plane thereof is in proportion to the local variation the transmission of light passing through lens L. Therefore, the local variations of light intensity in the radial direction for the shutter of the present invention and the ideal shutter correspond respectively to G' and H' in FIG. 5, wherein ordinate I is taken to be the light intensity and abscissa $r$ is taken in the radial direction of the image. That is, in the ideal shutter, a defocused image has a nearly uniform lightness. Whereas, in the shutter of the present invention the defocused image has maximum intensity at the center and decreases in intensity gradually toward its perimeter.

In general, a good defocused image, namely, a defocused image has maximum light intensity at the center and the intensity reduces toward its perimeter. Therefore the shutter of the present invention satisfies the condition described above better than the ideal shutter and can obtain a good defocused image. By the way, in this case it is desirable that the blade members are in a circular form as close as possible in the opening and closing processes.

Figure 11:
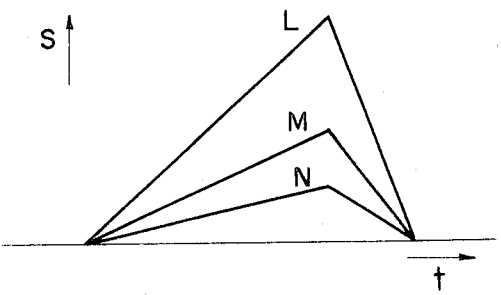
FIG. 11 shows the second example of the exposure curve in the case where the exposure time is set for a constant value and the aperture diameter is changed in the lens shutter in accordance with the present invention.
Figure 12:
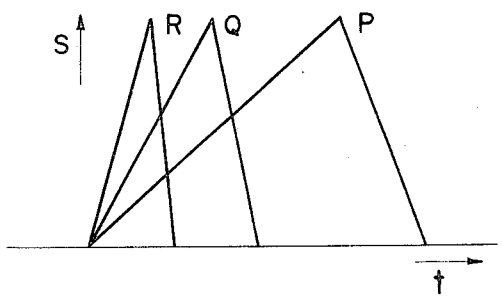
FIG. 12 shows the exposure curve in the case where the aperture diameter is set for a constant value and the exposure time is changed in the lens shutter of the invention.

The performance and action described above need not always require that the opening speed and the closing speed of the blade members are equal and symmetrical with each other as in the exposure curves shown FIG. 2. For example, as shown in FIG. 11 and FIG. 12 even though the opening time and the closing time are not symmetrical, by selecting the aperture diameter and the exposure time if both or either the opening speed and the closing speed of the blade members can be controlled as shown by the exposure curves L. M. N. or P. Q. R. it is possible to obtain the equivalent action. The third embodiment shown in FIG. 13 and FIG. 14 in accordance with the present invention satisfies this object.

Figure 13:
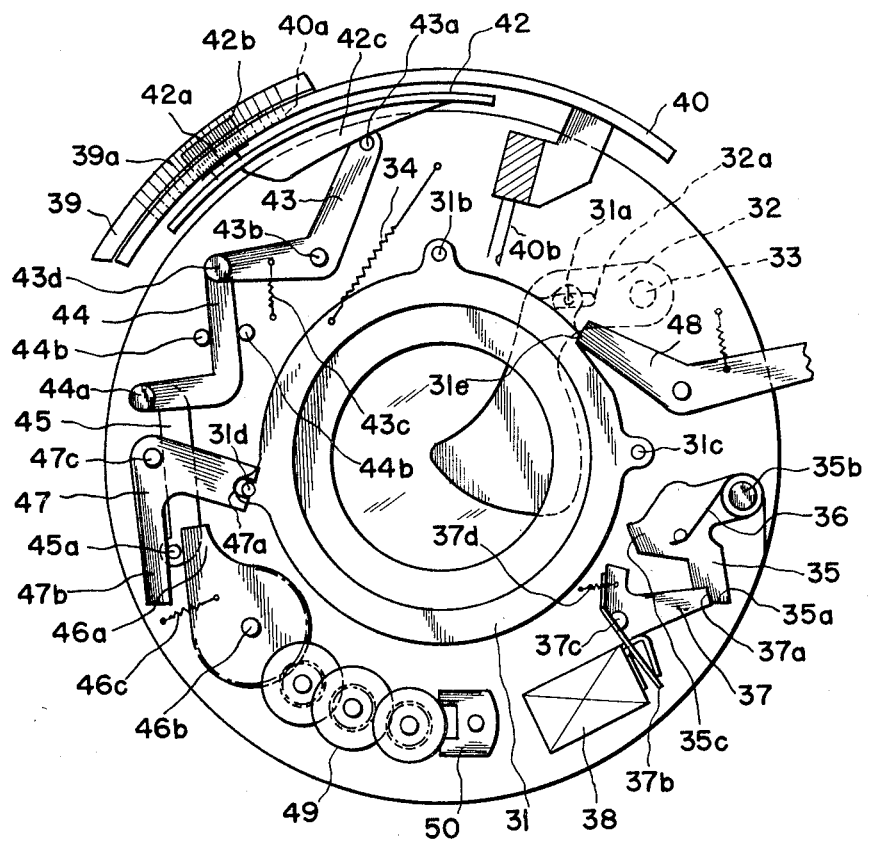
FIG. 13 is a front view of the third embodiment in accordance with the present invention having the exposure curve, shown in FIG. 11 and FIG. 12.
Figure 14:
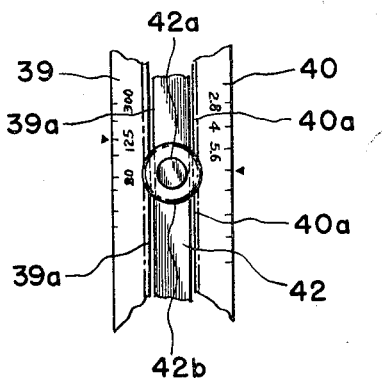
FIG. 14 is an enlarged side view of the exposure adjusting mechanism in the third embodiment shown in FIG. 13.

With reference to FIG. 13 and FIG. 14, on the shutter sheath, aperture setting ring 40 and exposure time setting ring 39 are provided in parallel so as to rotate along the outside wall. On the faces of both rings facing each other, teeth 39a and 40a are respectively provided, and blade driving ring 42 is connected to pin 42 of pinion 42b and meshed with teeth 39a and 40a and is provided rotatably on the similar shutter outside wall and therefrom cam 42c protrudes into the shutter casing. Pin 43a is provided on one end of lever 43 pivotally mounted by pin 43b to the shutter ground plate and has a counter-clockwise turning tendency through spring 43c and comes in contact and engages with cam 42c. Pin 43d provided on the other end of lever 43 is connected to one end of slide lever 44 and guided by guide pins 44b. To pin 44a, provided on the other end of slide lever 44, one end of blade driving change lever 45 is connected, and on the other end of lever 45 pin 45a is provided.

V-lever 47 having on one arm thereof fork portion 47a for receiving therein protrusion 31d provided on blade ring 31 supported rotatably in the shutter is pivoted rotatably on pin 47c, and between the other arm 47b of V-lever 47 and arm 46a of cam wheel 46 described hereinafter pin 45a is interposed.

Cam wheel 46 connected to pin 46b and has a counter-clockwise turning tendency through spring 46c is coupled with governor 50 by way of gear train 49.

On the other side, switch 40b protruding from diaphragm setting ring 40 into the shutter casing and ordinarily opened is located in the turning track of protrusion 31b of blade ring 31.

Blade ring 31 is provided with blade opening spring 34 to normally have a clockwise turning tendency, and includes protrusions 31a and 31c in addition to protrusions 31d and 31b. And, protrusion 31a is fitted in long slot 32a provided on blade member 32 connected rotatably to pin 33. On the periphery of blade ring 31, hook 31e is provided so as to engage with the pawl of release lever 48 to check blade ring 31 when rotated counter-clockwise against blade opening spring 34.

Blade closing lever 35 pivotally mounted by pin 35b to the shutter ground plate and having a clockwise turning tendency through strong blade closing spring 36, is provided with restraining arm 35a and driving protrusion 35c. Driving protrusion 35c, while lever 35 is turning clockwise, comes into contact with protrusion 31c of blade ring 31 to turn it counter-clockwise against blade opening spring 34. Retaining arm 35a engages with pawl 37a of retaining lever 37 pivotally mounted on the shutter ground plate by pin 37c when it is in the cocked position against the force of closing spring 36 and retained in that cocked position. Retaining lever 37 is provided fixedly with armature 37b facing electromagnet 38 mounted on the shutter ground plate.

The exciting coil for electromagnet 38 (not shown in the drawings) is formed so as to be opened and closed by switch 40b provided on aperture setting ring 40.

Therefore, when aperture setting ring 40 is moved without moving exposure time set up ring 39, pinion 42b is rotated and blade driving setting ring 42 is moved, so that lever 43 is rotated by cam 42c so as to move blade speed change lever 45 up and down by way of slide lever 44, and accordingly the position of blade speed change pin 45a interposed between arm 47b of V-lever 47 and arm 46a of cam wheel 46 is shifted, so that arms 47b and 46a undergo a change of effective length and the retarding interval due to governor 50 undergoes a change, and accordingly the clockwise turning speed of blade ring 31 by means of blade opening spring 34, namely, the opening speed of blade member 32 is changed. At the same time, the position of switch 40b is shifted so that the interval between protrusion 31b of blade ring 31 and switch 40b is changed. Thereupon, just as release lever 48 is operated, blade ring 31 is rotated clockwise at the opening speed determined by the tensile force of spring 34 and the resistance of governor 50 set by the position of blade speed change pin 45a. Just as protrusion 31b comes into switch with contact 40b to close it electromagnet 38 is excited to attract armature 37b, so that retaining lever 37 releases blade closing lever 35, and lever 35 is rotated clockwise through strong spring 36 and driving protrusion 35c comes into contact with protrusion 31c of blade ring 31 by a clockwise rotation to push it back against blade opening spring 34, so that after being opened to the aperture diameter set by the aforesaid contact position the blade members enter the closing process a closing speed determined by the difference of spring force between blade closing spring 36 and blade opening spring 34, and the resistance of governor 50. Therefore, when the closing speed is high in comparison with the opening speed, the exposure curve is as shown by curves L. M. N. in FIG. 11 and the exposure is effected at different speeds respectively for the opening speed and the closing speed for the different aperture diameter settings.

Then, without moving aperture setting ring 40, just as exposure time set up ring 39 is moved, in the same manner pinion 42b is rotated and blade driving speed setting ring 42 is moved. The position of blade speed change pin 45a is shifted, so that the resistance due to governor 50 undergoes a change and the opening speed of the blade members also undergoes a change but the interval between protrusion 31b and contact 40b does not undergo a change, therefore, the aperture diameter at the full opening of the blade members is unchangeable. And, the speed of blade ring 31 returned by blade closing lever 35 on account of switch 40b being closed also is changed respectively and the exposure is effected as shown by the exposure curves of P.Q.R in FIG. 12.

Figure 15:
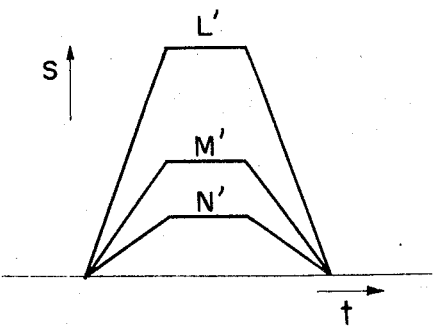
FIG. 15 shows the third example of the exposure curve in the case where the exposure time is set for a constant value and the aperture diameter is changed in the shutter in accordance with the present invention.

However, the exposure curve of the shutter in accordance with the present invention is not always limited to a triangular shape such as shown in FIG. 2, FIG. 3, FIG. 11 and FIG. 12, therefore, even for a shutter having the exposure curve group of L', M', N', for example, in the shape of a frustum of a cone such as shown in FIG. 15, if the opening speed and the closing speed of the blade members are retarded in comparison with the ideal shutter and yet can be changed in accordance with the setting of the aperture diameter or the setting of the exposure time, the performance and action achieved by the present invention in comparison with the ideal shutter as described above can be effected.

Figure 16:
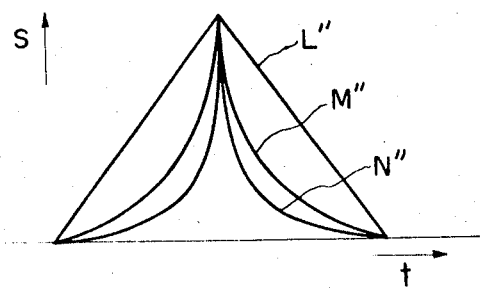
FIG. 16 shows the exposure curves in accordance with exposure time in the shutter in accordance with the present invention.

Besides, in the present invention the exposure curve of the shutter illustrated above is not required to be linear in the opening process or the closing process, for example, as shown in FIG. 16 even in a shutter wherein all of the exposure times are equal and the aperture is opened to the same diameter, by enabling to change both or either the opening speed and the opening acceleration of the blade members, and the closing speed and the closing acceleration of the blade members such as the exposure is changed in accordance with the settings of the aperture diameter and the effective exposure time as shown by curves L", M", N", the same object can be attained.

Figure 8:
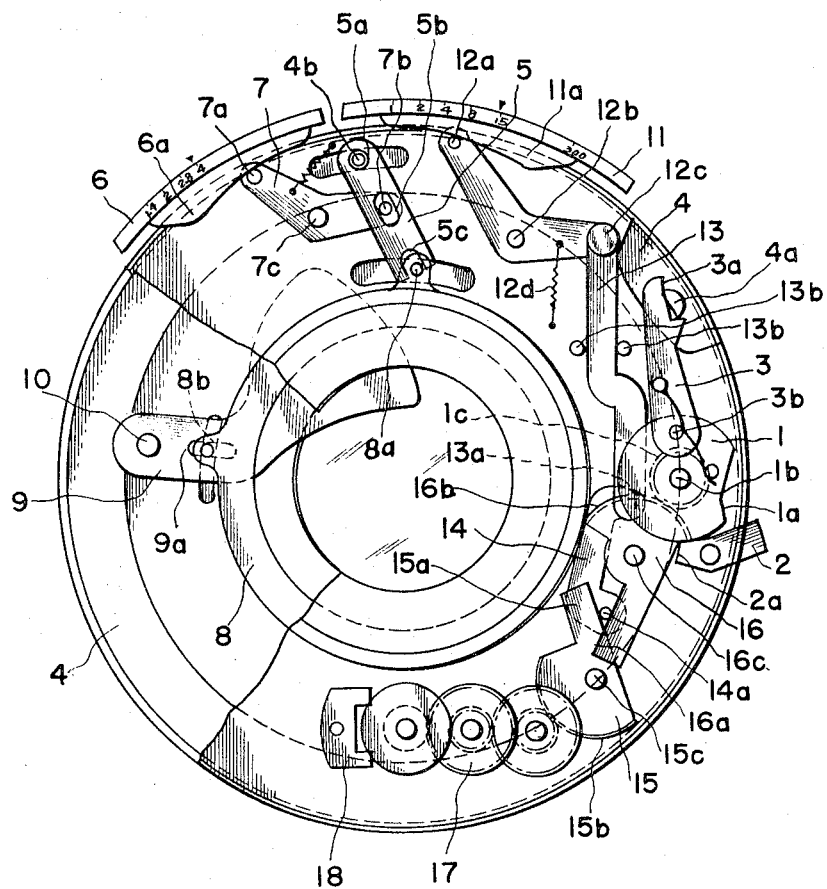
FIG. 8 is a front view of the embodiment shown in FIG. 7 with the shutter in a released condition.

To embody the shutter having the exposure curve such as shown in FIG. 15, in the shutter shown in FIG. 7 and FIG. 8 by changing the shape of main disk 1 the same object can be attained. However, also by attaching separately conventional diaphragm blades and increasing the aperture diameter of the shutter opened by the diaphragm setting member so as to be a little larger than the aperture diameter formed by the diaphragm setting member, and in addition ensuring that the diameter of the diaphragm corresponds to the set aperture diameter, the same object can be attained.

As for the shutter having the exposure curve shown in FIG. 16 the retarded action of the mechanical resistor can be changed during the opening or closing process of the blade members.

Even in any one of the various shutters described above in accordance with the present invention, as compared with the shutter of the prior art, the lens aberration can be reduced and it is possible to improve the defocused image, and yet the other shutter characteristics can be the same as those of the prior art shutter, and in addition the motion of a respective movable member of the shutter is slow as compared with the ideal shutter so that wear and tear due to abrasion and shock can be reduced and good durability of the mechanism can be obtained.

We claim

1. Camera lens shutter apparatus comprising:
an exposure time setting member;
an aperture setting member;
at least one blade member;
a first driven member for opening said blade member to a maximum aperture and for closing said blade member from said maximum aperture as a function of position thereof;
a second driven member;
means for driving said second driven member;
means for retarding said second driven member;
means for controlling the acceleration and for varying the speed of said second driven member in accordance with an exposure time set by said exposure time setting member;
means for transmitting the movement of said second driven member to said first driven member; and
means for adjusting said means for transmitting to change the rate of transmission of movement of said second driven member in accordance with the aperture set by said aperture setting member.

2. Camera lens shutter apparatus as in claim 1 wherein said first driving member closes said at least one blade member subsequent to the opening thereof.

3. Camera lens shutter apparatus as in claim 2 wherein said means for retarding further includes a first lever connected to said first driven means, a second lever, delay means connected to said second lever for controlling the speed of movement thereof, and means adjustable in accordance with the setting of said exposure time setting member and connected to said first and second levers whereby the movement of said first lever is transmitted to said second lever.

4. Camera lens shutter apparatus as in claim 3 wherein said delay means includes a rotatable disc of electrically conductive material, a gear train coupled between said second lever and said disc, electromagnetic means for braking said disc, and means for controlling said electromagnetic member.

5. Camera lens shutter apparatus as in claim 3 wherein said first driven member includes an intermediate ring rotatable for a predetermined amount from a start position and returnable to said start position, a sector ring movable with said at least one blade member, and an intermediate lever connected between said intermediate ring and said sector ring and rotatable about an axis movable in accordance with the setting of said aperture setting member.

6. Camera lens shutter apparatus as in claim 1 wherein said first driven member includes an operating member biased to close said at least one blade member, means for retaining said operating member in a rest position, means for releasing said means for retaining, means for actuating said means for releasing, said releasing means including an electromagnet, said means for actuating including means for switching to control said electromagnet, means for actuating said means for switching movable with said at least one blade member, said means for switching is connected to said first control means and moved in accordance with the setting of said aperture setting member, and said first control means controls said means for retarding in accordance with the positioning of said means for switching.

* * * * *